United States Patent [19]

Cholod et al.

[11] 4,356,299

[45] Oct. 26, 1982

[54] CATALYST SYSTEM FOR A POLYETHYLENE TEREPHTHALATE POLYCONDENSATION

[75] Inventors: Michael S. Cholod, Cornwells Heights, Pa.; Nipun M. Shah, Fayetteville, N.C.

[73] Assignee: Rohm and Haas Company, Philadelphia, Pa.

[21] Appl. No.: 345,859

[22] Filed: Feb. 4, 1982

[51] Int. Cl.³ ...................... C08G 63/04; C08G 63/34
[52] U.S. Cl. ................................... 528/279; 528/285; 260/429.5
[58] Field of Search .............................. 528/279, 285; 260/429.5

[56] References Cited

U.S. PATENT DOCUMENTS

| | | | |
|---|---|---|---|
| 3,441,540 | 4/1969 | Müller et al. | 528/279 |
| 3,453,241 | 7/1969 | Jeurissen et al. | 528/279 |
| 3,965,071 | 6/1976 | McClelland | 528/279 |
| 4,010,145 | 3/1977 | Russin et al. | 528/280 |

*Primary Examiner*—Lucille M. Phynes
*Attorney, Agent, or Firm*—Jordan J. Driks

[57] ABSTRACT

A polyethylene terephthalate polycondensation catalyst system comprises from about 2 parts to about 18 parts of catalyst metal in the form of an alkyl titanate and from about 40 parts to about 300 parts of catalyst metal in the form of an antimony compound, each of said metals being per million parts of polymer product.

24 Claims, No Drawings

CATALYST SYSTEM FOR A POLYETHYLENE TEREPHTHALATE POLYCONDENSATION

BACKGROUND OF THE INVENTION

This invention relates to a polyethylene terephthalate polycondensation catalyst system. More particularly, this invention relates to a polyethylene terephthalate polycondensation catalyst system wherein reduced amounts of catalyst system are utilized to achieve a shorter time for polycondensing the polyethylene terephthalate prepolymer to an intrinsic viscosity of 0.60 decaliters per gram (dl/g).

U.S. Pat. No. 4,010,145 is directed to a catalyst-inhibitor system for the polymerization of polyethylene terephthalate for fabrication of fibers and films. The catalyst-inhibitor system comprises a combination of organic or inorganic salts of manganese and cobalt; titanium alkoxides and antimony compounds; and a phosphate ester. The '145 patent teaches that the ester interchange reaction between dimethyl terephthalate and ethylene glycol is conducted in the presence of the catalyst system and that, subsequently, a phosphate ester is added before polycondensation of the product of the ester interchange reaction.

The '145 patent further teaches that the catalyst system, which is used for the ester interchange reaction, includes the manganese and cobalt salts and an antimony compound in an amount of 50 to 300 parts per million of antimony and a titanium alkoxide in an amount of 20 to 60 ppm of titanium.

The disadvantages of a product obtained by following the teachings of the '145 patent are that the large amount of titanium required resulted in a product which generally had a yellow coloration. Additionally, the polyethylene terephthalate product prepared according to the teachings of the '145 patent exhibited a less than desirable thermal stability (i.e. on regrinding of a resin prepared by the '145 patent, the resultant reground resin exhibited a high acetaldehyde content and the intrinsic viscosity of the resultant reground resin was reduced). This less than desirable thermal stability would manifest itself in that, when the reground resin was formulated into an article, such as a bottle, liquids stored in such bottle would exhibit an off-taste, in that the acetaldehyde would affect the taste of the liquid stored in the bottle and that the resultant reground resin would also exhibit a lower intrinsic viscosity which translates into a reduced mechanical strength.

Additionally, the process set forth in U.S. Pat. No. 4,010,145 required more time to produce a polyethylene terephthalate polycondensation resin suitable for formation into fabricated articles such as a bottle. The additional time results in an economic disadvantage when preparing such polyethylene terephthalate resins.

It is an object of this invention, therefore, to provide a polycondensation catalyst system for the preparation of a polyethylene terephthalate resin.

Another object of this invention is to provide a polyethylene terephthalate polycondensation catalyst system which will result in a shortened period of time for the polycondensation reaction.

Other objects and advantages will become apparent from the following description and claims.

DETAILED DESCRIPTION

Broadly, this invention contemplates a polyethylene terephthalate polycondensation catalyst system comprising from about 2 parts to about 18 parts of catalyst metal in the form of an alkyl titanate and from about 40 parts to about 300 parts of catalyst metal in the form of an antimony compound, each of said metals being per million parts of polymer product.

It is surprising to find that the above objects, as well as other objects, could be accomplished by utilizing a polycondensation catalyst system which uses a reduced amount of titanium metal, along with an antimony compound, for the polycondensation reaction only.

The polyethylene terephthalate prepolymer may be formed in either of two ways. The prepolymer may be formed by an ester interchange reaction or by the direct esterification reaction between ethylene glycol and terephthalic acid.

If the prepolymer is to be formed by an ester interchange, the ester interchange reaction takes place between ethylene glycol and dimethyl terephthalate. The reaction is generally conducted under atmospheric pressure and at a temperature of from about 160° C. to about 225° C. During the reaction, methyl alcohol is distilled off as a by-product.

If the prepolymer is to be prepared by the direct esterification reaction of ethylene glycol and terephthalic acid, the reaction is conducted under a pressure of 1 or 2 atmospheres and at a temperature of from about 220° C. to about 260° C. During the esterification reaction, water is distilled off.

Although the direct esterification reaction may be conducted without a catalyst, a catalyst is often used to reduce esterification time, minimize the diethylene glycol content of the final polyethylene terephthalate product and to improve the color of the final product. Among the esterification catalysts which may be used are zinc acetate, calcium acetate, titanium ethoxide, manganous acetate, antimony oxalate, and the like. Esterification catalysts are well known in the art, and this invention is not to be construed as being limited to any particular esterification catalyst.

The direct esterification reaction is considered complete when no further water is distilled off or the amount of water distilled is about 90% to 95% of the theoretical yield.

The mole amount of ethylene glycol used for each mole of dimethyl terephthalate or terephthalic acid used will vary from about 1.8 to about 2.2 moles of ethylene glycol per mole of dimethyl terephthalate or terephthalic acid and preferably will be a mole ratio of from about 2 to about 1.

If less than 1.8 moles of the ethylene glycol is used for each mole of terephthalic acid or dimethyl terephthalate, then the reaction will not go to completion efficiently. If an amount in excess of 2.2 moles of ethylene glycol for each mole of dimethyl terephthalate or terephthalic acid is used, then there will be more glycol present then is needed, although such greater amounts may result in a faster reaction rate. However, the economic disadvantage of using more glycol then is necessary may offset the faster reaction rate.

The amount of metal containing catalyst which is used in the ester interchange reaction may vary widely. Generally, an amount of catalyst will be present which is from about 20 parts to about 200 parts of catalyst metal, per million parts of dimethyl terephthalate.

Among the catalysts which may be used for the ester interchange reaction are manganous acetate, lithium acetate, sodium methylate, magnesium acetate, cobalt acetate, calcium acetate, cobalt dichloride, manganese acetate tetrahydrate, zinc acetate, and the like.

The ester interchange reaction is considered complete when, at the temperature of from about 160° to about 225° C., either the amount of methanol distilled from the reaction is about 90 to 95% of the theoretical yield or no further methanol is removed.

After the ester interchange or direct esterification reaction is completed, the reaction mixture containing the polyethylene terephthalate prepolymer is then polycondensed. The polycondensation reaction is conducted at a temperature of from about 265° C. to about 300° C. and at a vacuum of less than about 1 torr.

The polycondensation catalyst is added after the ester interchange reaction is completed. If the polycondensation catalyst system is added at the ester interchange stage, then a reduced polycondensation time is not obtained.

The polycondensation catalyst system comprises from about 2 to about 18 parts of catalyst metal in the form of an alkyl titanate, per million parts of polymer product, and from about 40 parts to about 300 parts of catalyst metal in the form of an antimony compound, also per million parts of polymer product.

The alkyl titanate used may be any alkyl titanate such as titanium tetraisobutoxide, tetraisopropyl titanate, tetra-n-butyl-titanate, tetramethyl titanate, acetyl triisopropyl titanate, tetraisobutyl titanate, and the like.

It is preferred, however, that the alkyl titanate be present in an amount of from about 8 parts to about 15 parts, as aforesaid.

The second component of the polycondensation catalyst system is an antimony compound. The antimony compound is present in an amount of from about 40 parts to about 300 parts of catalyst metal, per million parts of polymer product.

Among the antimony compounds which may be used are antimony trioxide, antimony glucoxide, antimony butoxide, acetyl antimony dibutoxide, and the like.

It is preferred, however, that the antimony compound be present in an amount of from about 75 parts to about 150 parts, as aforesaid.

In a particularly preferred embodiment, the polycondensation catalyst system will comprise from about 10 to about 14 parts of tetraisopropyl titanate and from about 100 to about 160 parts of antimony trioxide, said parts each being per million parts of polymer product.

A chain branching agent may also be present during the polycondensation reaction. The presence of a chain branching agent is often desirable to increase the melt viscosity of the final polyethylene terephthalate resin. The chain branching agent may be present at any stage during the preparation of the polyethylene terephthalate resin. Thus, the chain branching agent may be added during the ester interchange reaction, or it may be added during the polycondensation reaction itself. If a chain branching agent is to be present, the chain branching agent is present in an amount of from about 0.1 to about 2 mole percent based on the moles of dimethyl terephthalate present or of terephthalic acid which may be present, if the prepolymer is formed by the direct esterification reaction between ethylene glycol and terephthalic acid.

It is preferred that, when a chain branching agent is present, the branching agent be present in an amount of from about 0.2 to about 1 mole percent as aforesaid, because the effect of the chain branching agent is thereby maximized.

Among the chain branching agents which may be used are pentaerythritol, dimethylol propionic acid, trimesic acid, and the like.

When preparing the polyethylene terephthalate resin, the starting materials may include other acidic comonomers besides dimethyl terephthalate and/or terephthalic acid, so that the final product will have up to 2% of repeating units other than those derived from dimethyl terephthalate or terephthalic acid. Other comonomers which may be present in an amount of up to about 2% percent, as aforesaid, may be diethylene glycol, isophthalic acid, propane-1,3-diol, butane-1,4-diol, polytetramethylene glycol, polyethylene glycol, polypropylene glycol, 1,4-hydroxymethylcyclohexane, bibenzoic acid, naphthalene 1,4- or 2,6-dicarboxylic acid, adipic acid, sebacic acid, decene-1,10-dicarboxylic acid and esters thereof, and the like.

It should be understood that, when the polyethylene terephthalate prepolymer is prepared by an ester interchange reaction, any other comonomers which are included are all esters, and when the direct esterification route is used, such other comonomers are all acids.

One may also include other glycols besides ethylene glycol in an amount so that the final product will have up to 2% of repeating units other than those derived from ethylene glycol. Among such other glycols may be mentioned neopentyl glycol, propylene glycol, butylene glycol, and the like.

The polyethylene terephthalate resin may also include various additives, such as antioxidant stabilizers, ultraviolet light screening agents, extrusion aids, dyes or pigments, and mold release agents and the like. Other additives will be apparent to one skilled in the art. Whichever additive or additives are used, such must not adversely affect the resin when said resin is applied for its intended use.

If desired, the molecular weight of the resultant resin may be increased by heating the resin above its glass transition temperature but below its melting point and passing a stream of an inert gas over the resin or by holding the resin under vacuum for a period of from about 8 to about 14 hours and at a temperature of from about 200° C. to about 235° C.

In the examples which follow, intrinsic viscosity (IV) is determined in a 60/40 phenol/symmetrical tetrachloroethane at 30° C.

In order to more fully illustrate the nature of this invention and the manner of practicing the same, the following examples are presented.

GENERAL PROCEDURE

To a three-necked reaction vessel equipped with a stirrer, a condensor arranged for distillation, and a thermometer, is added 1,000 parts of dimethyl terephthalate, 626 parts of ethylene glycol, 0.07 part of manganese as manganous acetate (70 parts per million of final product), and 0.02 part of cobalt as cobalt acetate (20 parts per million of final product). The reaction mixture is heated at a temperature of from 160° C. to 225° C. for a period of 97 minutes while removing 290 parts of methanol. Phosphorus acid (0.148 part) is then added as a stabilizer. The ester interchange is considered complete when 90 to 95% of the theoretical yield of methanol is removed, or when no further methanol is removed. The polycondensation catalyst system is then added in amounts as set forth in the following table. The polycondensation catalyst system used is tetraisopropyl titanate and antimony trioxide. The pressure is reduced to less than 1 torr and the reaction temperature is increased to 280° C. to 290° C. to remove ethylene glycol by-product. The intrinsic viscosity is then measured, as is the time required to complete the polycondensation reaction (i.e. the time required to reach an IV of 0.6 dl/g).

For comparative purposes, several examples are conducted where the polycondensation catalyst is either titanium or antimony, but not in combination with one another.

TABLE I

| Examples | Polycondensation Catalyst (PC) | Amount of PC (Parts of Metal Per Million Parts Of Final Product) | Time Required (Minutes) to Obtain an IV of 0.6 (dl/g) |
|---|---|---|---|
| 1 | Tetraisopropyl titanate | 2 | 250 |
| 2 | Antimony trioxide | 60 | 240 |
| 3 | Antimony trioxide | 240 | 115 |
| 4 | Antimony trioxide | 120 | 123 |
| 5 | Antimony trioxide and tetraisopropyl titanate | 50<br>8 | 65 |

EXAMPLES 6 THROUGH 9

In examples 6 through 9, the general procedure is repeated, except that, as indicated in the table below, all of the catalysts are added both at the ester interchange reaction, as well as added, in a different run, only at the polycondensation stage. The polycondensation time is then measured for the ester interchange added catalyst system and for the polycondensation added catalyst system. Additionally, in some instances, as indicated in the table below, only titanium is used as the catalyst and is added both at the ester interchange stage, as well as added, in a different run, only at the polycondensation stage. In all other respects, the general procedure is repeated.

The results are as follows:

TABLE II

| Examples | Polycondensation Catalyst (PC) | Amount of PC (Parts of Metal Per Million Parts of Final Product) | Time Required (Min.) to Reach IV of 0.60 (dl/g) (When PC Added at Ester Interchange Reaction Stage) | Time Required (Min.) to Reach IV of 0.60 (dl/g) (When PC Added at Polycondensation Reaction Stage) |
|---|---|---|---|---|
| 6 | Tetraisopropyl titanate | 10 | 135 | 84 |
| 7 | Tetraisopropyl titanate | 19.5 | 70 (resultant resin is yellow) | 49 |
| 8 | Tetraisopropyl titanate and antimony trioxide | 10<br>100 | 60 | 51 |
| 9 | Tetraisopropyl titanate and antimony trioxide | 18<br>100 | 52 (resultant resin is a very slight yellow) | 45 |

While this invention has been described in terms of certain preferred embodiments and illustrated by means of specific examples, the invention is not to be construed as limited, except as set forth in the following claims.

We claim:

1. A polyethylene terephthalate polycondensation catalyst system comprising from about 2 parts to about 18 parts of catalyst metal in the form of an alkyl titanate and from about 40 parts to about 300 parts of catalyst metal in the form of an antimony compound, each of said metals being per million parts of polymer product.

2. A polyethylene terephthalate polycondensation catalyst system according to claim 1 wherein said alkyl titanate is present in an amount of from about 8 parts to about 15 parts.

3. A polyethylene terephthalate polycondensation catalyst system according to claim 1 wherein said antimony compound is present in an amount of from about 75 parts to about 150 parts.

4. A polyethylene terephthalate polycondensation catalyst system according to claim 1 wherein said alkyl titanate is present in an amount of from about 8 parts to about 15 parts, and said antimony compound is present in an amount of from about 75 parts to about 150 parts.

5. A polyethylene terephthalate polycondensation catalyst system according to claim 1 wherein said alkyl titanate is tetraisopropyl titanate.

6. A polyethylene terephthalate polycondensation catalyst system according to claim 1 wherein said alkyl titanate is tetra-n-butyl titanate.

7. A polyethylene terephthalate polycondensation catalyst system according to claim 1 wherein said alkyl titanate is tetramethyl titanate.

8. A polyethylene terephthalate polycondensation catalyst system according to claim 1 wherein said alkyl titanate is acetyl triisopropyl titanate.

9. A polyethylene terephthalate polycondensation catalyst system according to claim 1 wherein said alkyl titanate is tetraisobutyl titanate.

10. A polyethylene terephthalate polycondensation catalyst system according to claim 1 wherein said antimony compound is antimony trioxide.

11. A polyethylene terephthalate polycondensation catalyst system according to claim 1 wherein said antimony compound is antimony glucoxide.

12. A polyethylene terephthalate polycondensation catalyst system according to claim 1 wherein said antimony compound is antimony butoxide.

13. A polyethylene terephthalate polycondensation catalyst system according to claim 1 wherein said antimony compound is acetyl antimony dibutoxide.

14. A polyethylene terephthalate polycondensation catalyst system according to claim 1 wherein said alkyl titanate is tetraisopropyl titanate and said antimony compound is antimony trioxide.

15. A polyethylene terephthalate polycondensation catalyst system according to claim 1 wherein up to about 2 mole percent of the polyethylene terephthalate polymer is branched.

16. A polyethylene terephthalate polycondensation catalyst system according to claim 15 wherein the branched portion of said polyethylene terephthalate contains a pentaerythritol derived moiety.

17. A polyethylene terephthalate polycondensation catalyst system according to claim 15 wherein the branched portion of said polyethylene terephthalate contains a dimethylol propionic acid derived moiety.

18. A polyethylene terephthalate polycondensation catalyst system according to claim 15 wherein the branched portion of said polyethylene terephthalate contains a trimesic acid derived moiety.

19. A polyethylene terephthalate polycondensation catalyst system according to claim 1 wherein said polyethylene terephthalate includes up to 2%, based on the number of repeating units of said polyethylene terephthalate, of a comonomer derived moiety.

20. A polyethylene terephthalate polycondensation catalyst system according to claim 19 wherein said comonomer derived moiety is derived from isophthalic acid.

21. A polyethylene terephthalate polycondensation catalyst system according to claim 19 wherein said comonomer derived moiety is derived from dimethylisophthalate.

22. A polyethylene terephthalate polycondensation catalyst system according to claim 19 wherein said comonomer derived moiety is derived from neopentyl glycol.

23. A polyethylene terephthalate polycondensation catalyst system according to claim 19 wherein said comonomer derived moiety is derived from diethylene glycol.

24. A polyethylene terephthalate polycondensation catalyst system comprising about 10 to about 14 parts of catalyst metal in the form of tetraisopropyl titanate and from about 100 to about 160 parts of catalyst material in the form of antimony trioxide, both metals being per million parts of polymer product, and wherein from about 0.2 to about 0.5 mole percent of the polyethylene terephthalate is branched with a pentaerythritol derived moiety and wherein said polyethylene terephthalate includes up to 2%, based on the number of repeating units of said polyethylene terephthalate, of a comonomer derived from dimethylisophthalate.

* * * * *

Disclaimer

4,356,299.—*Michael S. Cholod*, Cornwells Heights, Pa. and *Nipun M. Shah*, Fayetteville, N.C. CATALYST SYSTEM FOR A POLYETHYLENE TEREPHTHALATE POLYCONDENSATION. Patent dated Oct. 26, 1982. Disclaimer filed Aug. 8, 1983, by the assignee, *Rohm and Haas Co.*

Hereby enters this disclaimer to claims 1 through 24 of said patent.

[*Official Gazette January 29, 1985.*]